United States Patent [19]

Johansson et al.

[11] Patent Number: 5,209,899

[45] Date of Patent: * May 11, 1993

[54] COMPOSITE SPACER WITH INCONEL GRID AND ZIRCALOY BAND

[75] Inventors: Eric B. Johansson, Wrightsville, N.C.; Bruce Matzner; Gerald M. Latter, both of San Jose, Calif.

[73] Assignee: General Electric Company, San Jose, Calif.

[*] Notice: The portion of the term of this patent subsequent to Feb. 18, 2009 has been disclaimed.

[21] Appl. No.: 754,825

[22] Filed: Sep. 4, 1991

Related U.S. Application Data

[63] Continuation-in-part of Ser. No. 633,046, Oct. 25, 1990, Pat. No. 5,089,221.

[51] Int. Cl.$^5$ .............................................. G21C 3/34
[52] U.S. Cl. ............................. 376/442; 376/438; 376/441
[58] Field of Search ............. 376/442, 441, 438, 448, 376/453; 976/DIG. 79, DIG. 78, DIG. 80, DIG. 81

[56] References Cited

U.S. PATENT DOCUMENTS

| | | | |
|---|---|---|---|
| 3,654,077 | 4/1972 | Lass et al. | 376/442 |
| 3,753,855 | 8/1973 | Donck | 376/441 |
| 4,190,494 | 2/1980 | Olsson | 376/462 |
| 4,675,154 | 6/1987 | Nelson et al. | 376/444 |
| 4,740,350 | 4/1988 | Taleyarkhan | 376/441 |
| 5,017,332 | 5/1991 | Dix et al. | 376/370 |
| 5,089,221 | 2/1992 | Johansson et al. | 376/442 |

FOREIGN PATENT DOCUMENTS

1010567 12/1977 United Kingdom .

*Primary Examiner*—Donald P. Walsh
*Assistant Examiner*—Meena Chelliah
*Attorney, Agent, or Firm*—Robert R. Schroeder

[57] ABSTRACT

An improved spacer is disclosed which contains an Inconel grid and a Zircaloy surrounding band. The Inconel grid can be fabricated from the extremely thin and highly elastic spring metal utilizing a modification of a prior art cell construction that includes paired inwardly bent vertical spring legs with cantilevered and rod encircling upper and lower arm pairs The spring legs extend at spaced apart locations between the upper and lower arm pairs and have a medial spring rod contacting portion for biasing the rods into stops on the rod encircling arm pairs. The springs at the upper and lower ends are provided with spring dimple stops to prevent over stressing of the spring during assembly or handling of the fuel bundle into which the spacer is incorporated. The rod encircling arm pairs have an offset from center where the two arms meet at their distal ends to complete encirclement of the rods. This offset from center enables the cells to be fastened in cell pairs at their respective embracing arms. The cell pairs can in turn be manipulated as a unit to define the necessary types of spacer grids required for any particular grid construction. A preferred grid construction for a ten by ten fuel rod matrix is disclosed including a grid filling all rod lattice positions for the bottom of a fuel bundle, a grid enabling the placement of a water rod of varying diameter, and finally a grid defining missing lattice positions for overlying partial length rods and permitting upward venting of steam with minimum pressure drop. An all Zircaloy band is disclosed for surrounding containment of the Inconel grid. The band consists of two or four segments Apertures are provided in the band at the corners, and portions of the corner Inconel cells project into these apertures, keying the Inconel grid to the Zircaloy band. The band is welded into continuous encircling relation. There results a spacer with an Inconel grid and surrounding Zircaloy band having minimum pressure drop and minimum neutron absorption useful with a high density fuel rod matrix required in modern fuel bundle design.

1 Claim, 16 Drawing Sheets

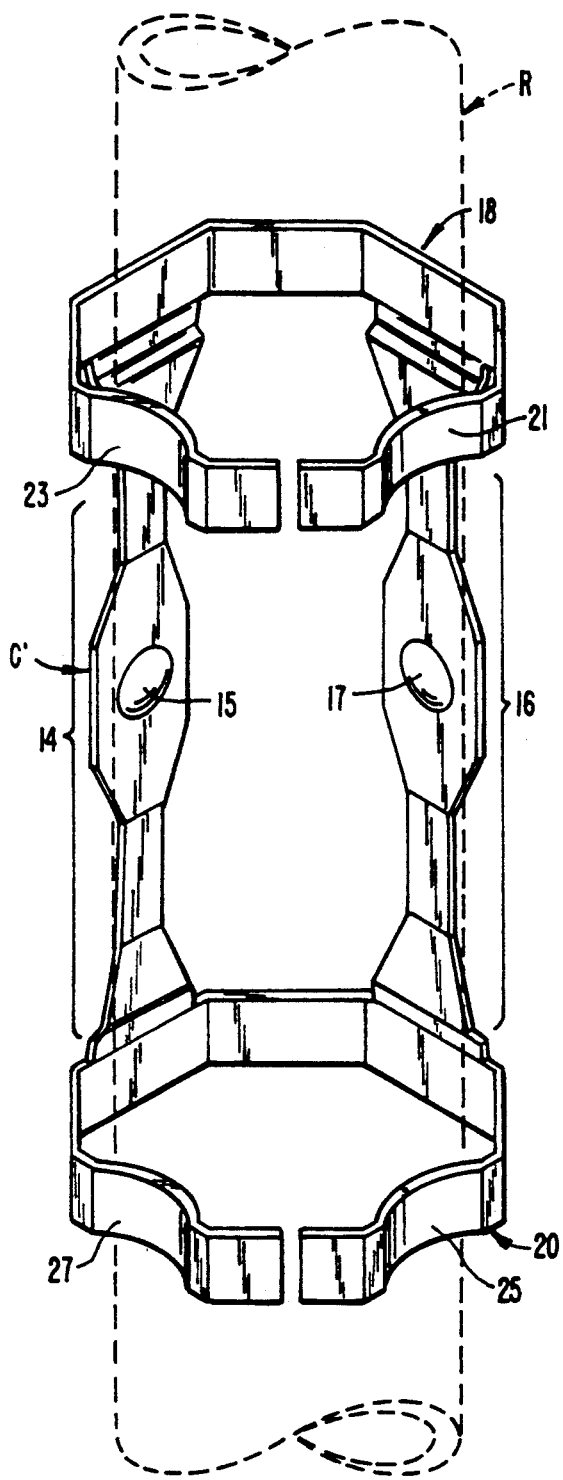
FIG._1A. PRIOR ART
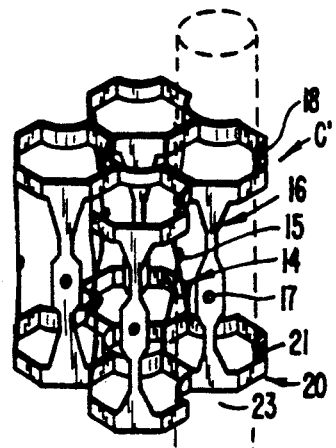
FIG._1C. PRIOR ART
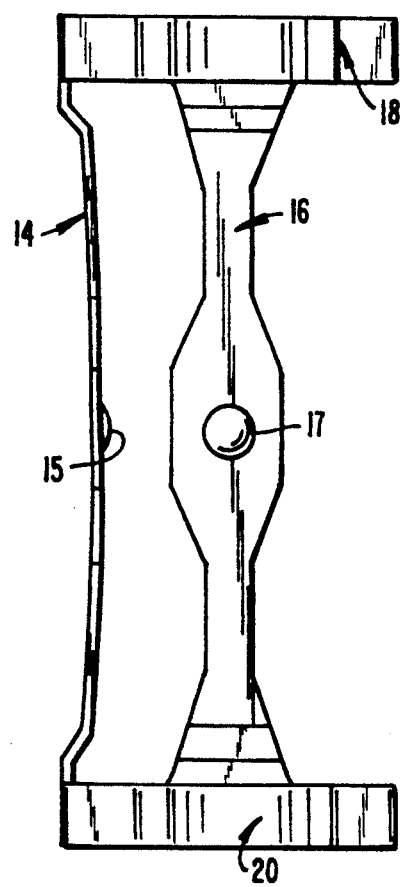
FIG._1B. PRIOR ART

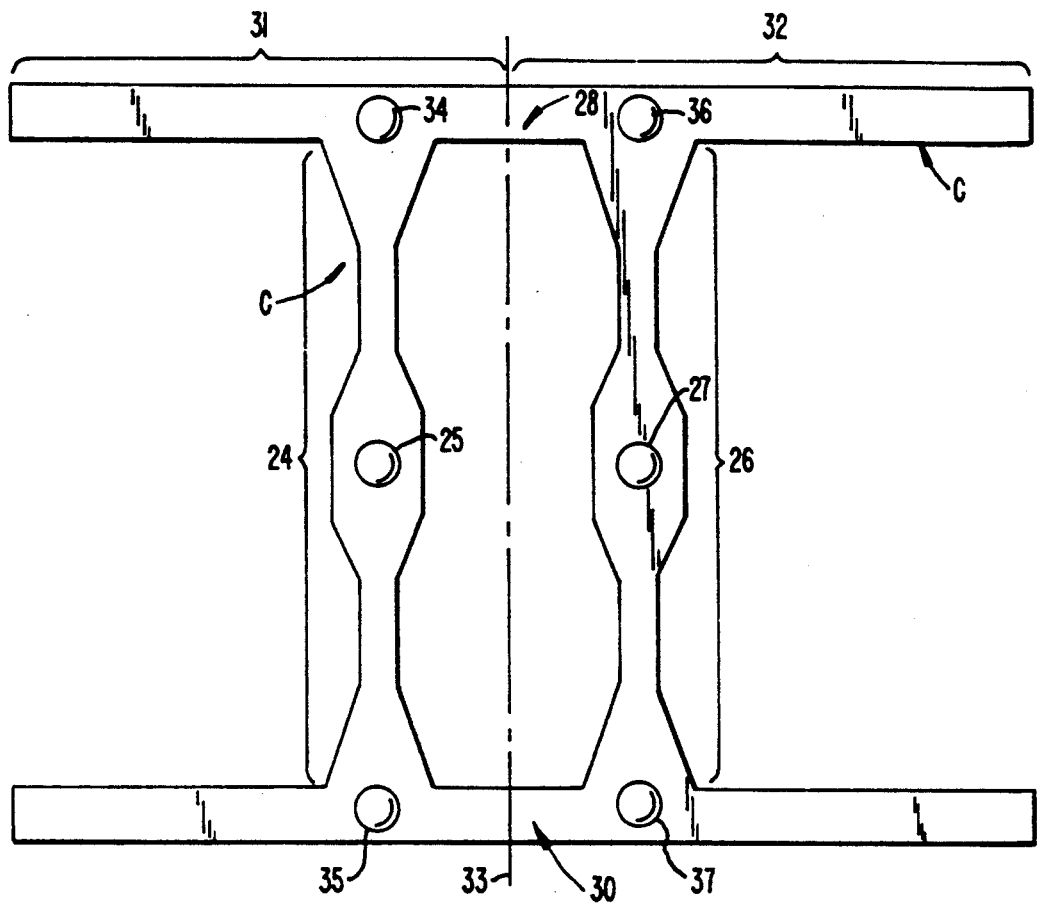
FIG._2A.
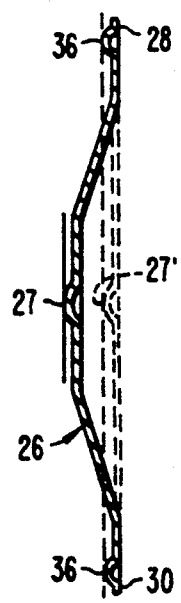
FIG._2C.

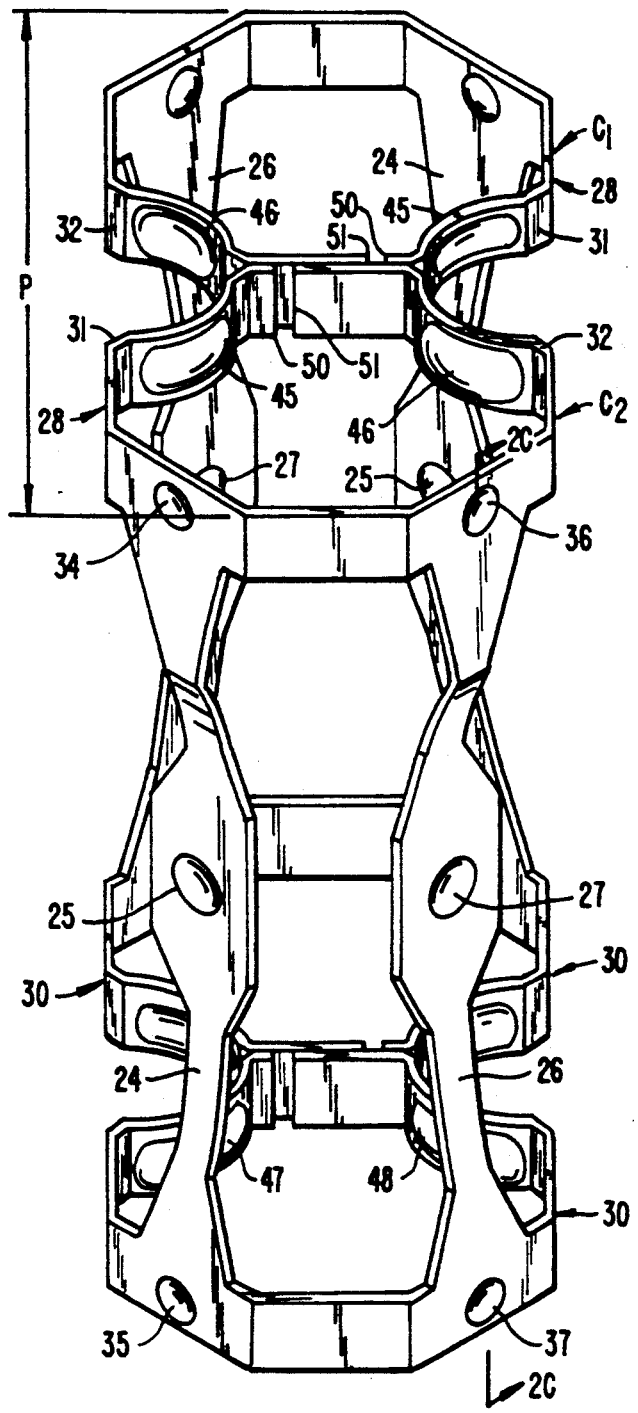
FIG._2B.
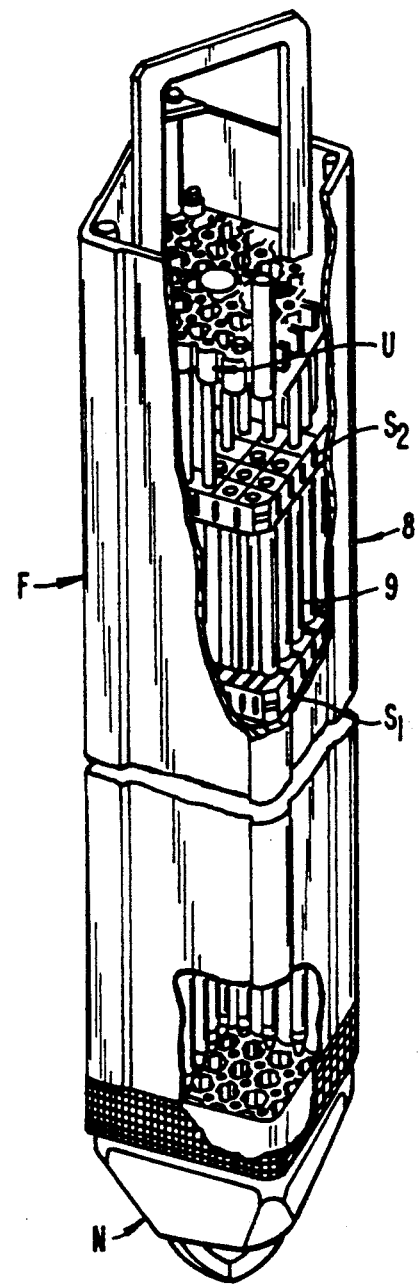
FIG._15.

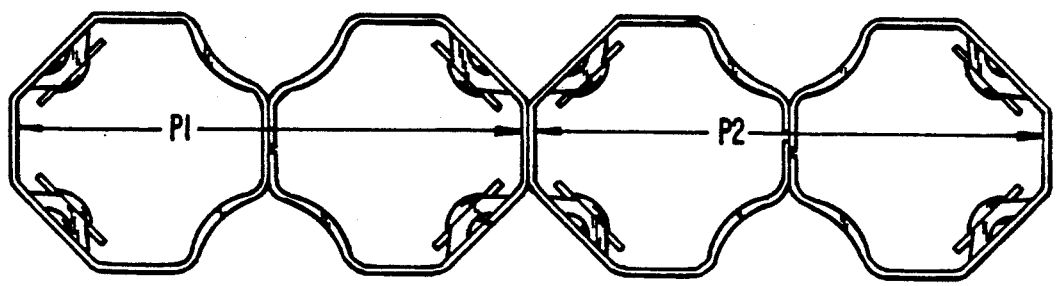
FIG._3A.
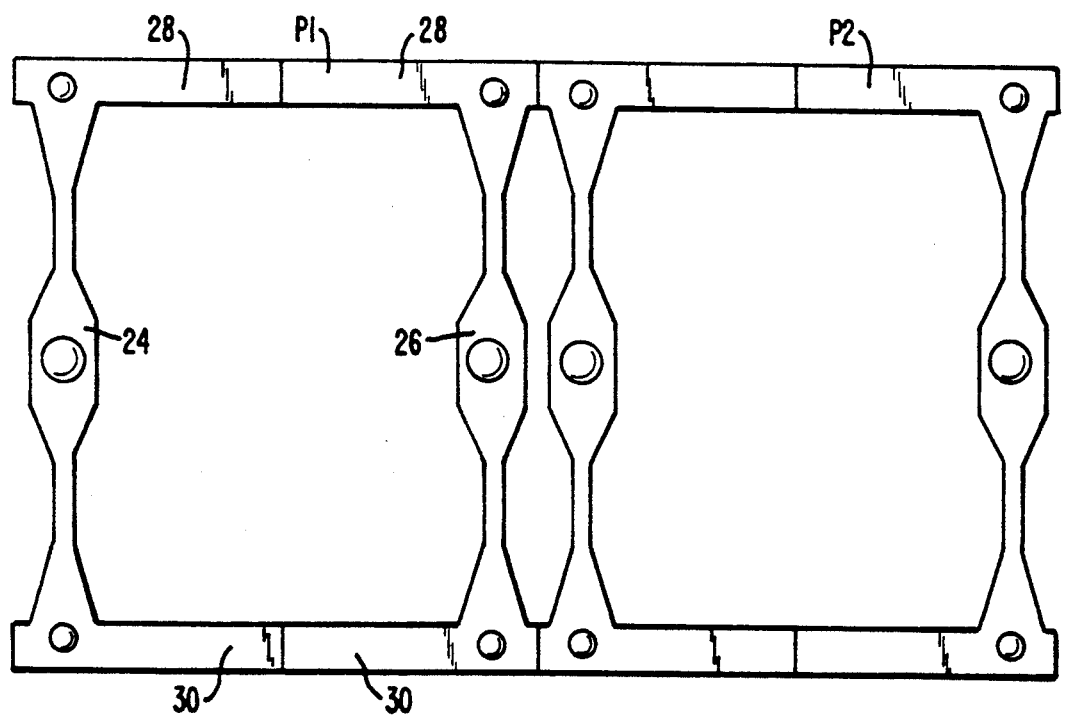
FIG._3B.

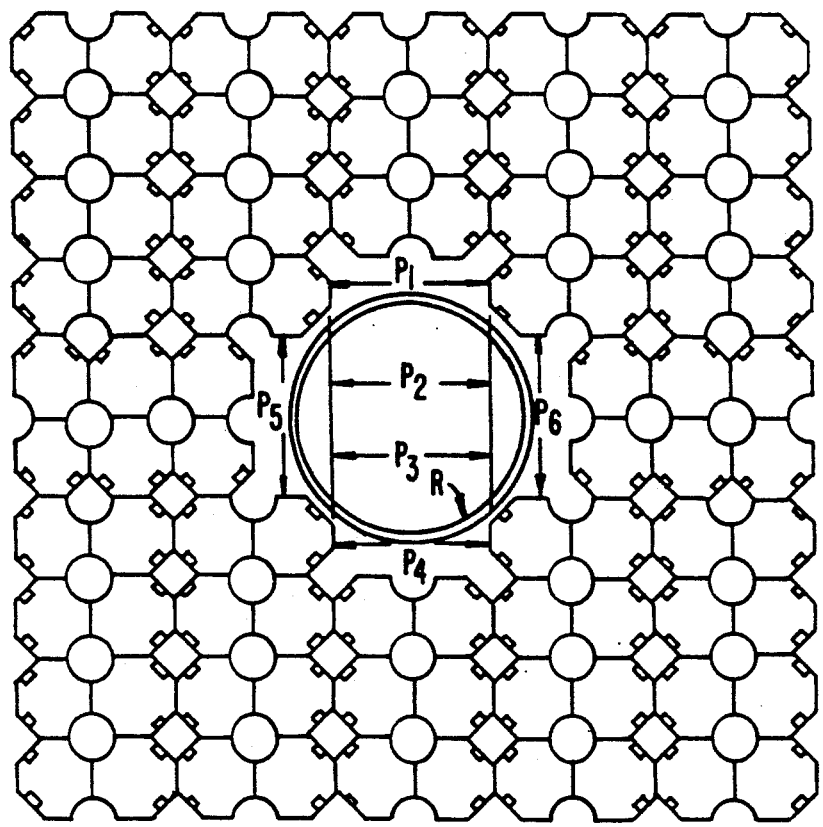
FIG._4.
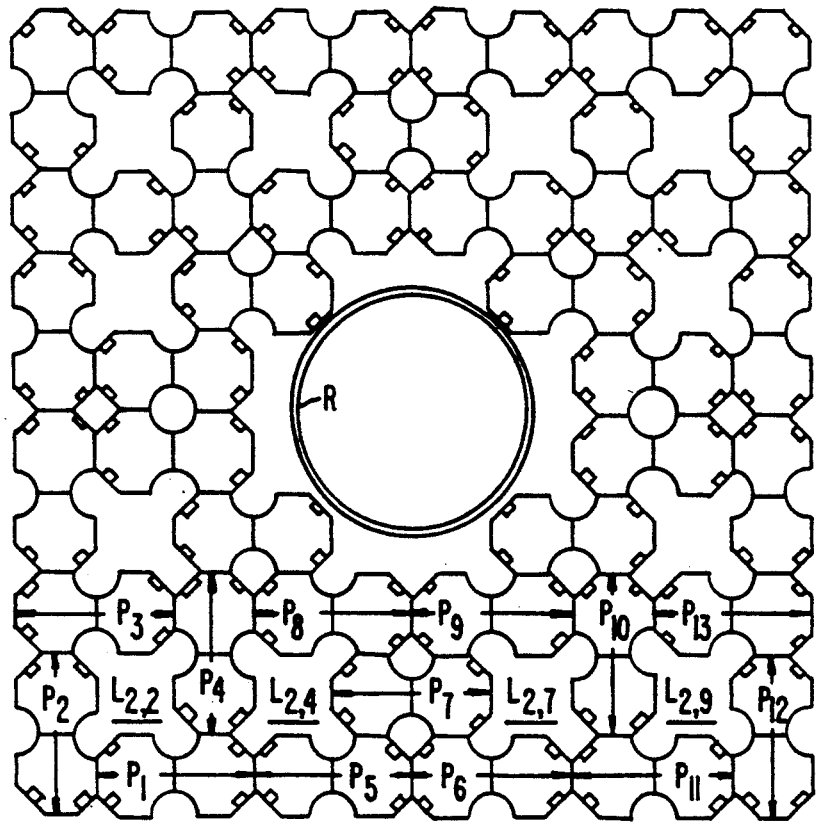
FIG._5.

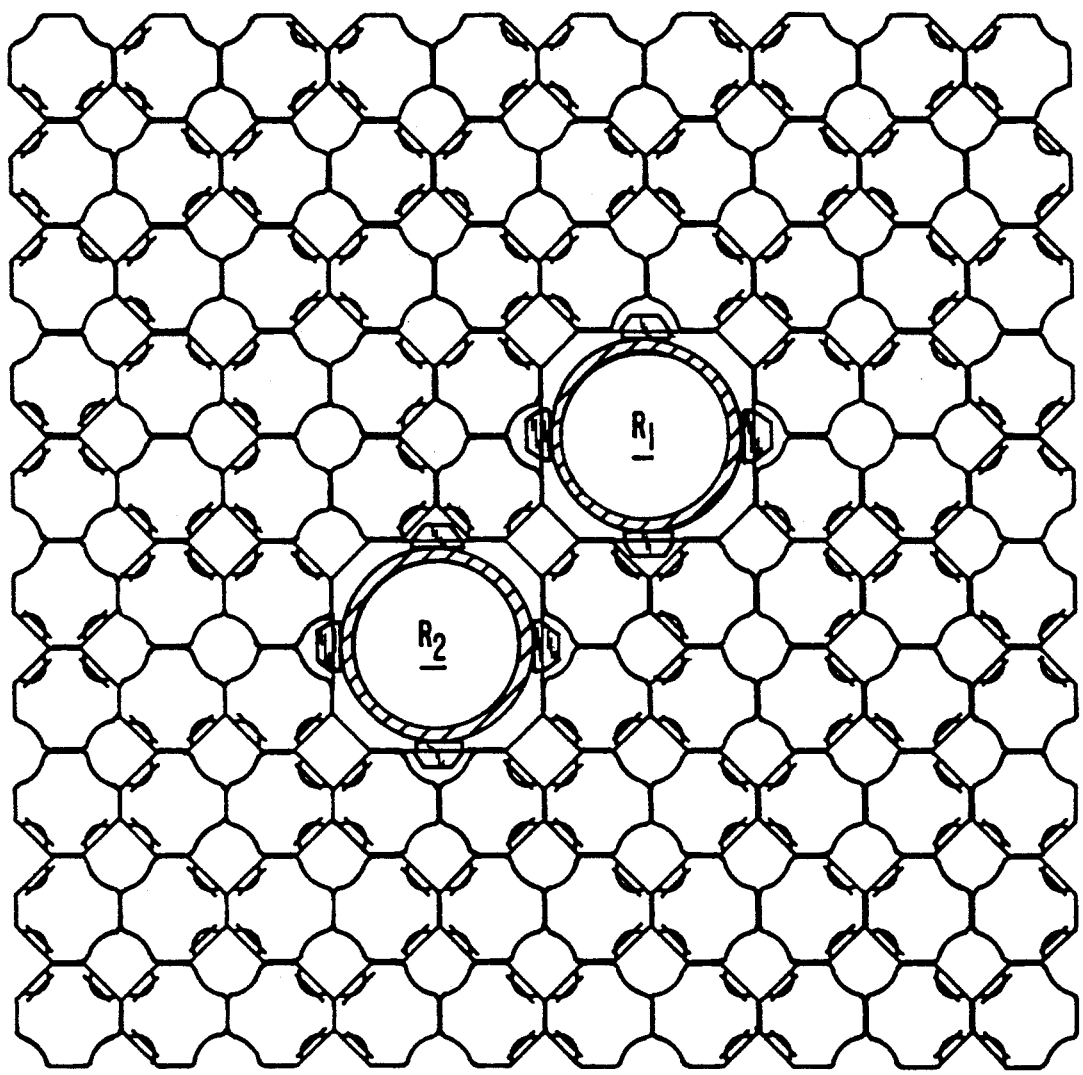
FIG._6.

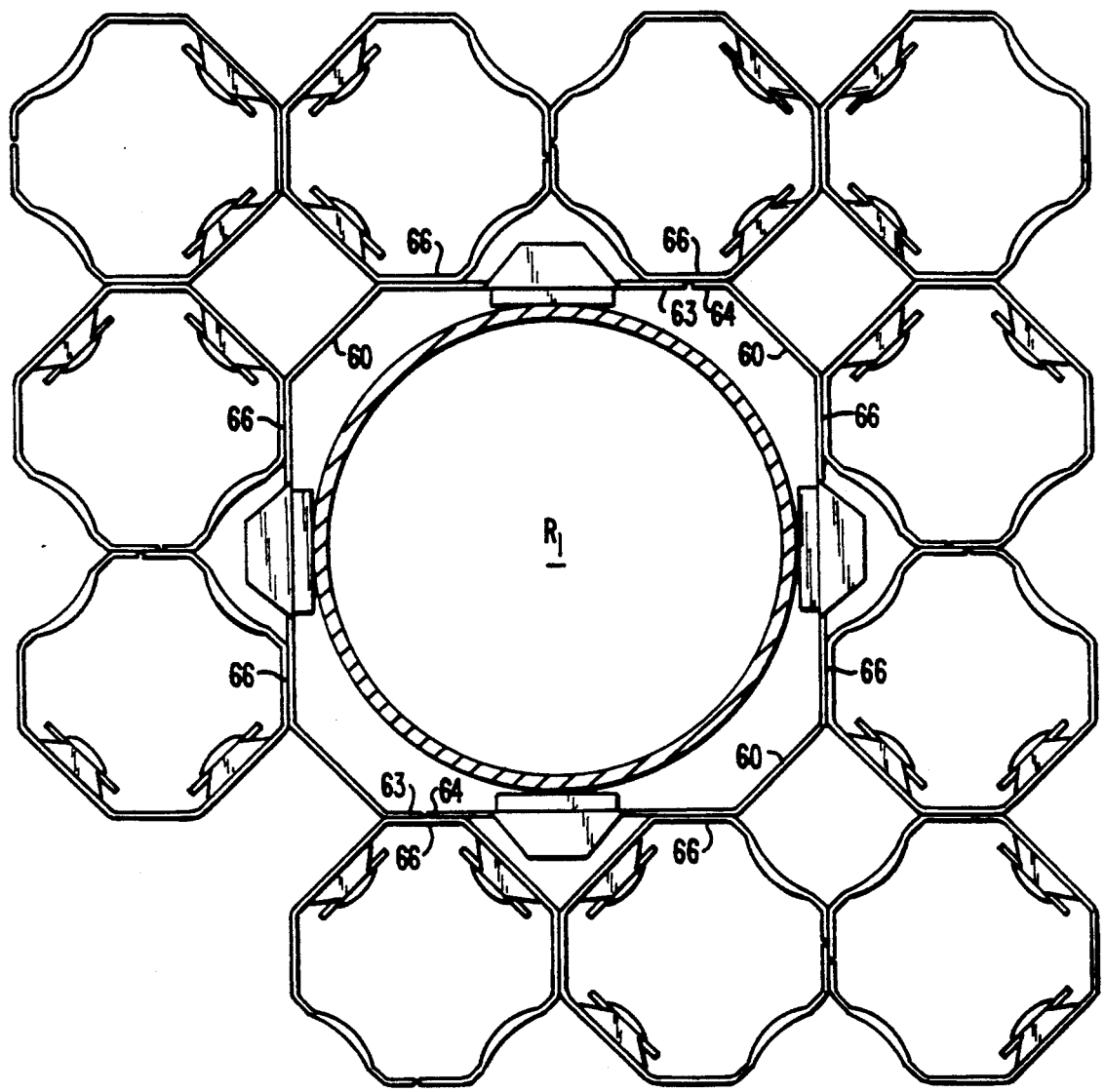
FIG._7.

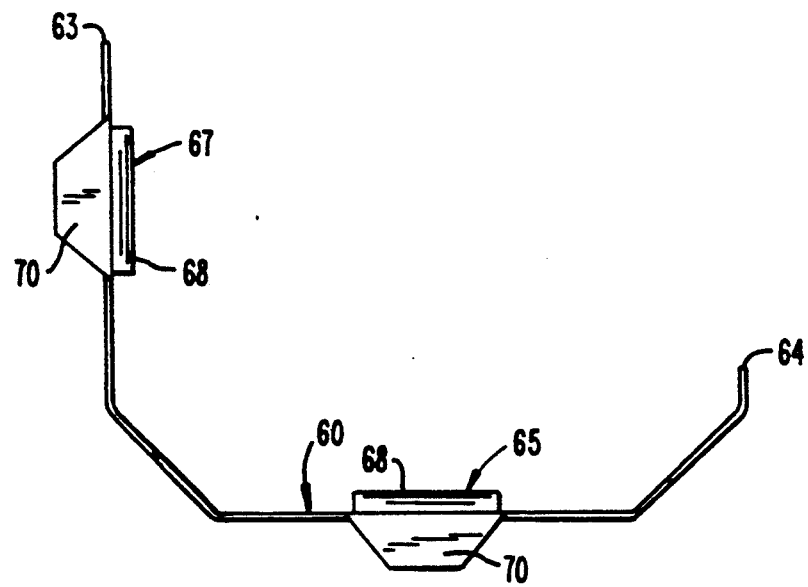
FIG._8A.
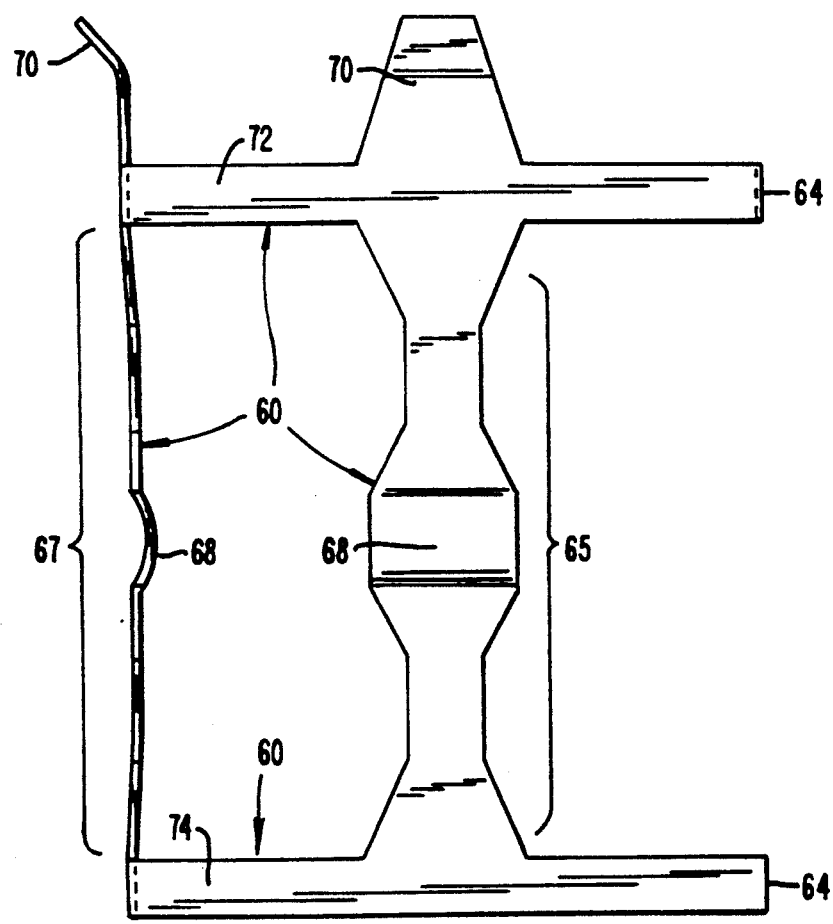
FIG._8B.

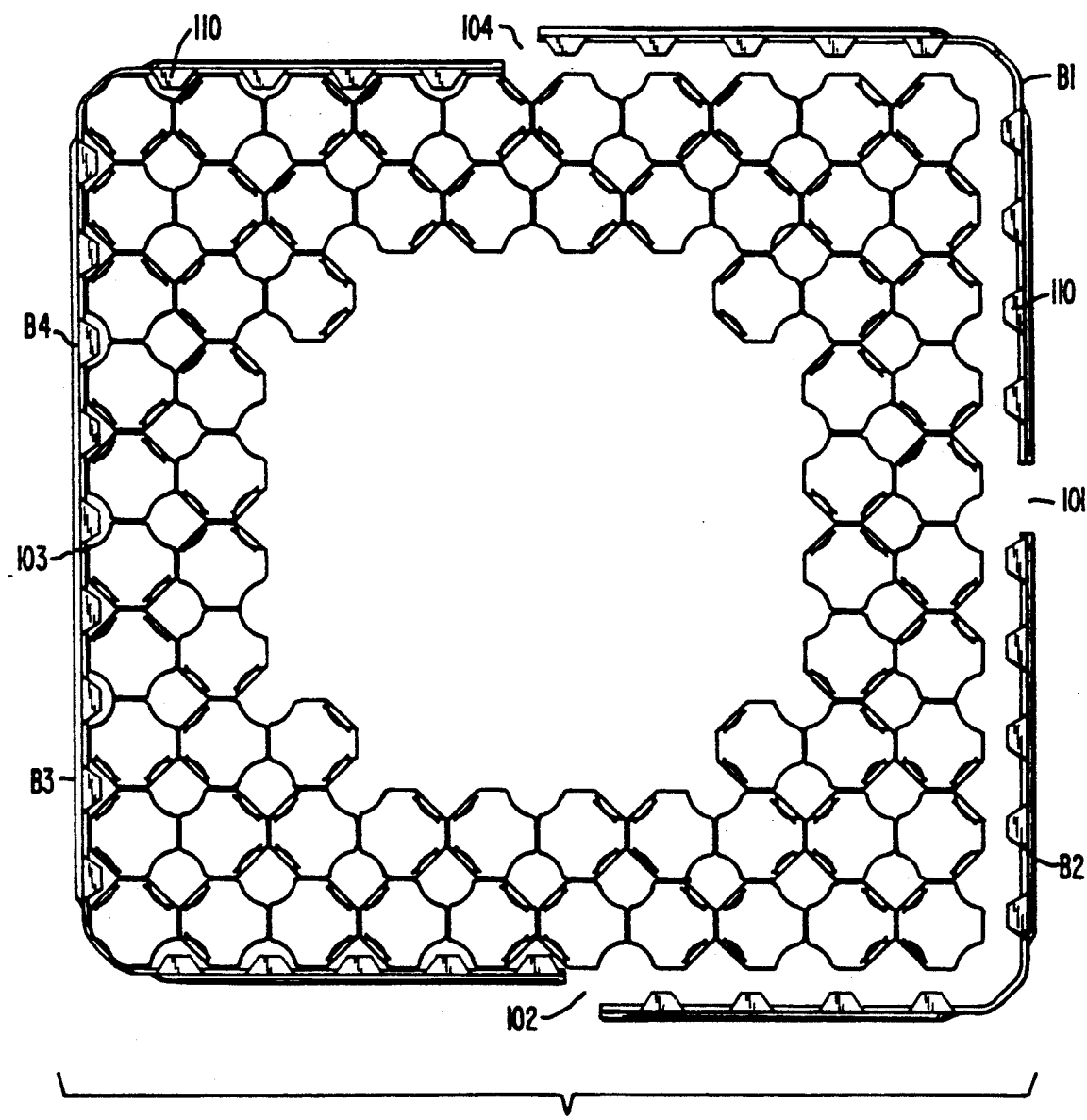
FIG._9.

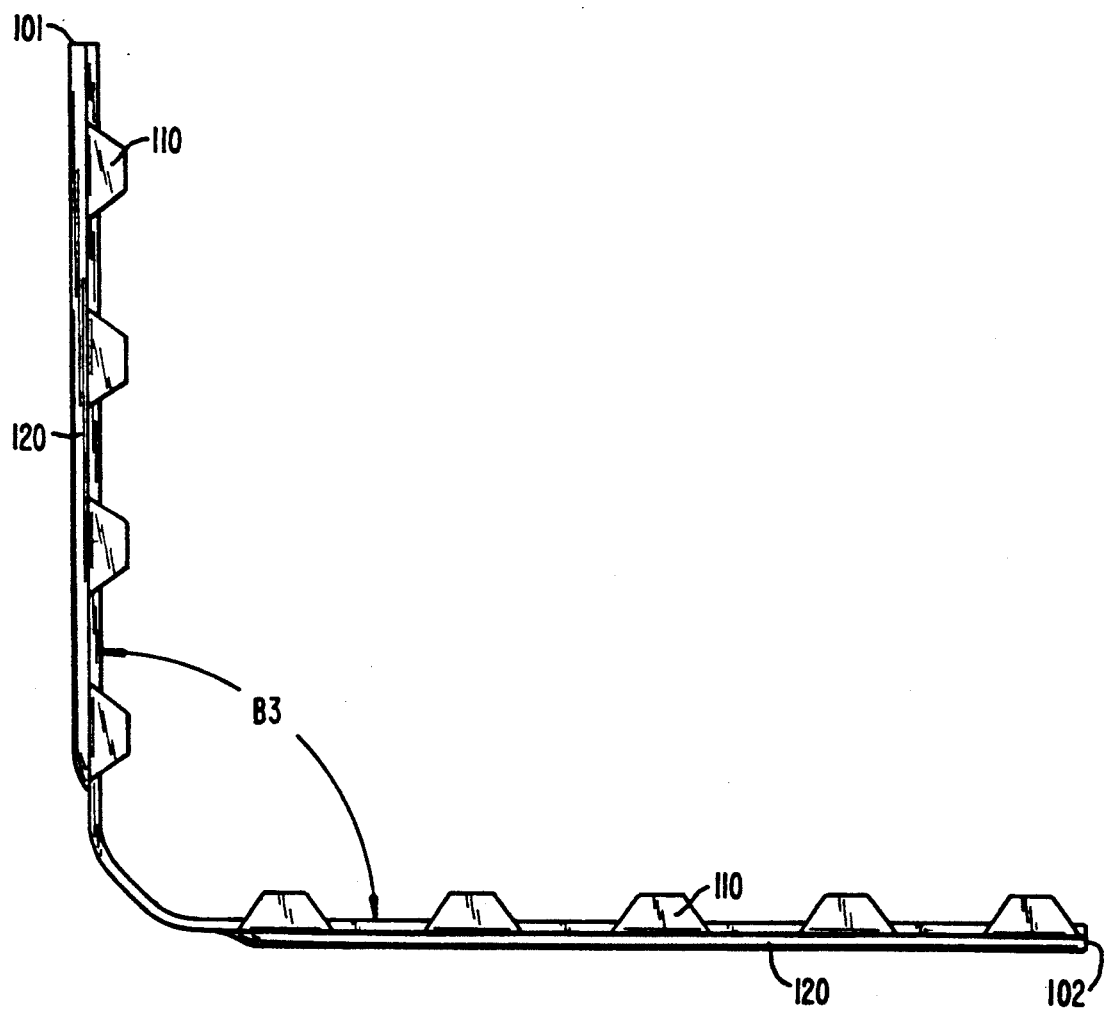
FIG._10.

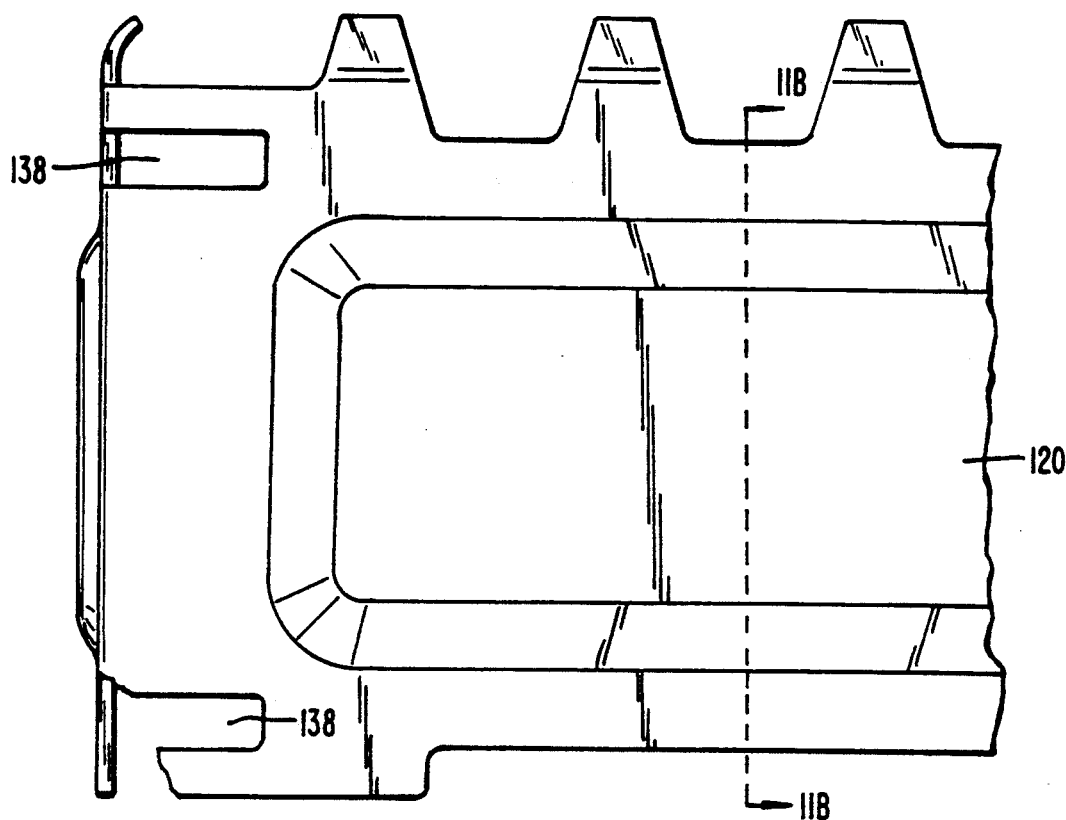
FIG._11A.
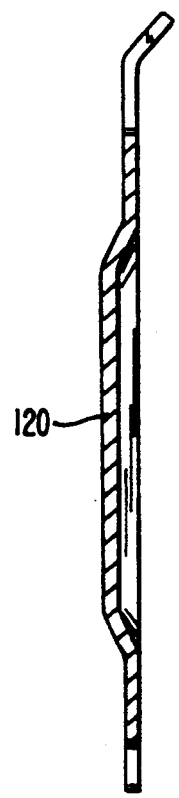
FIG._11B.

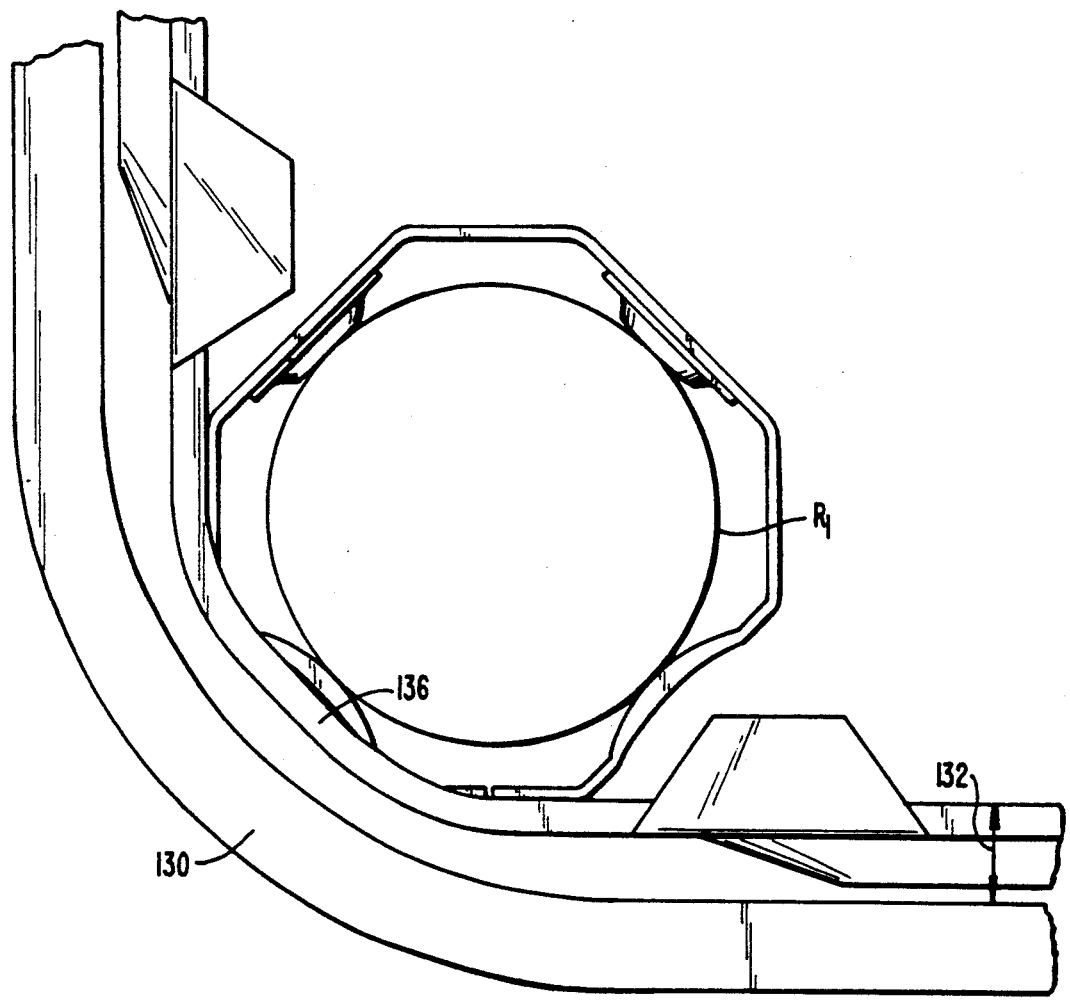
FIG._11C.

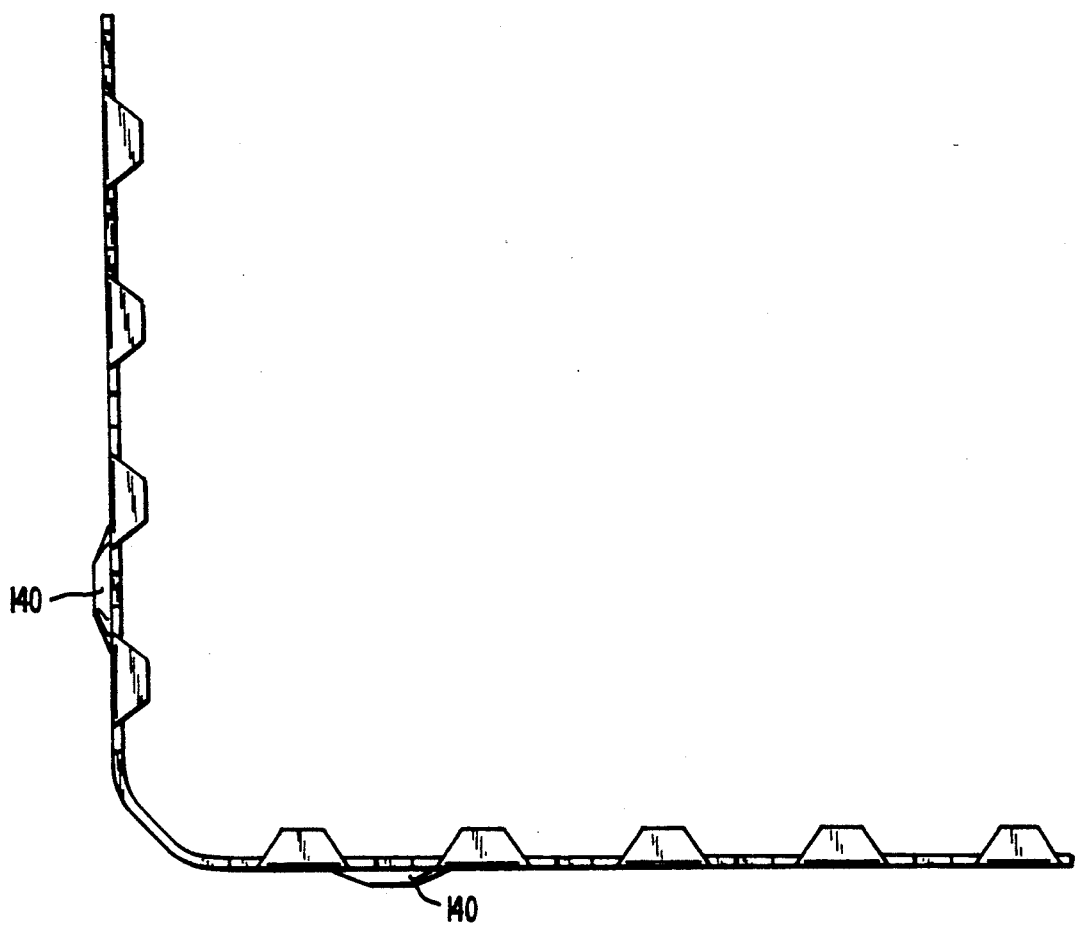
FIG._12A.
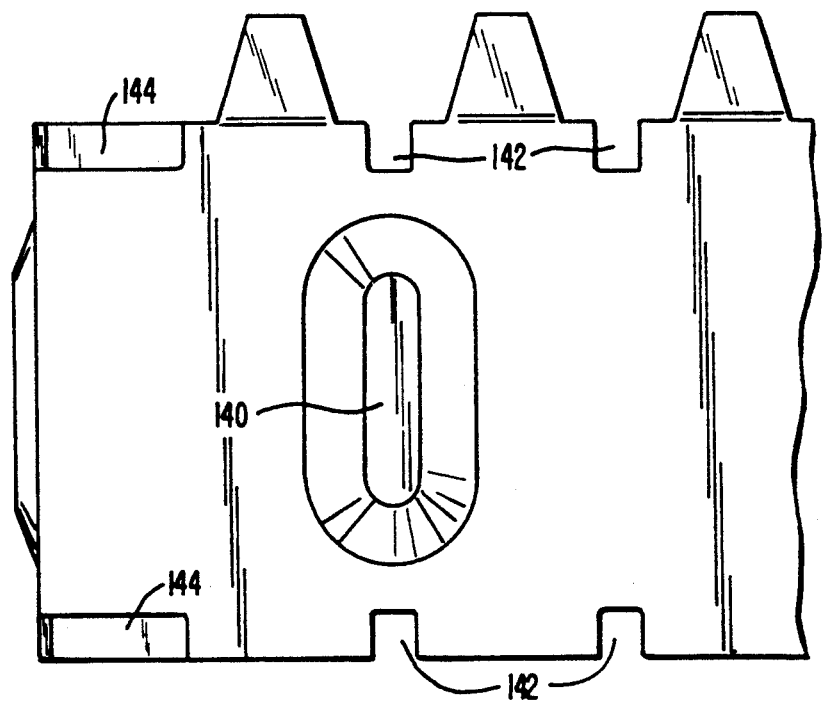
FIG._12B.

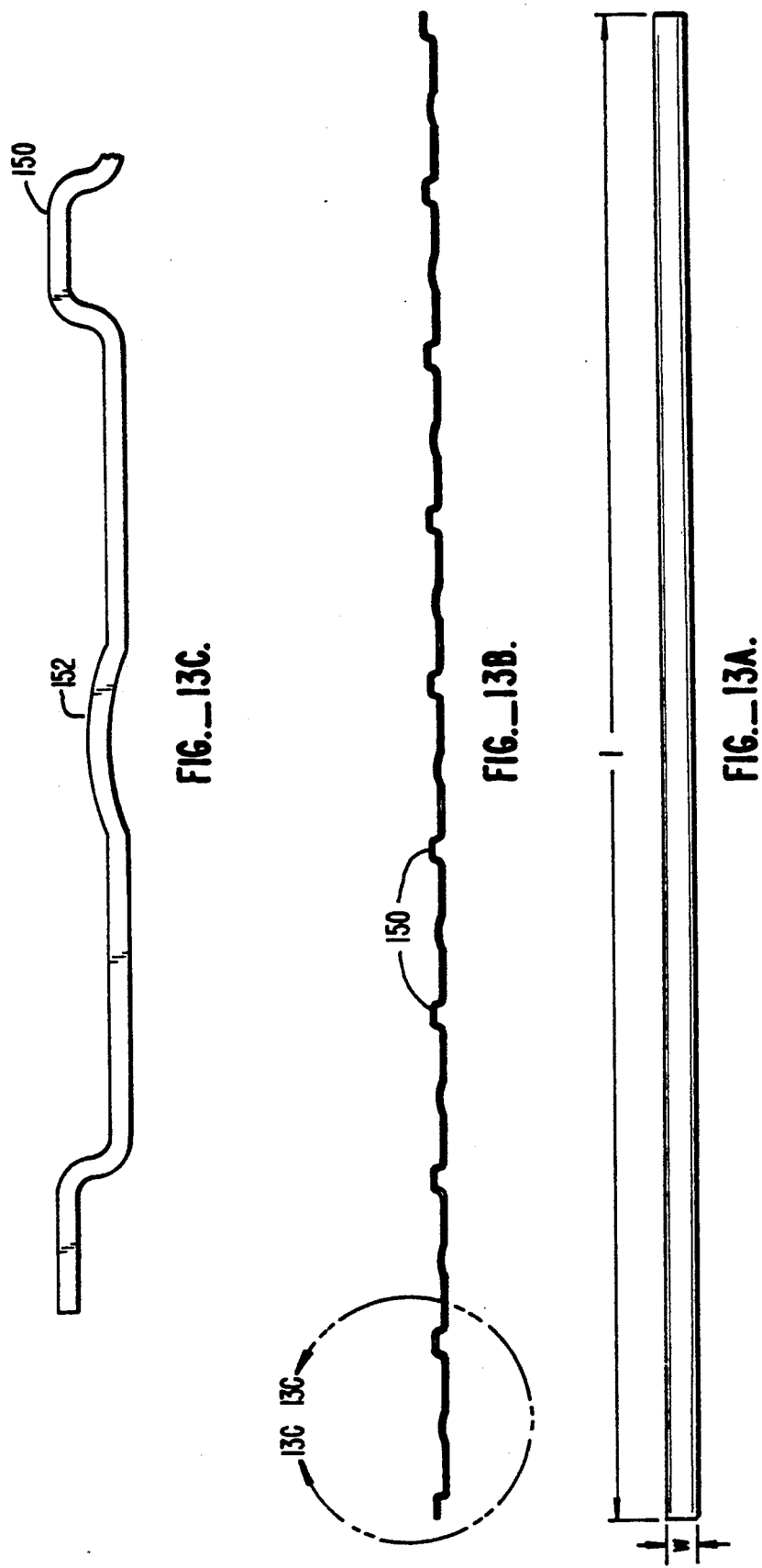

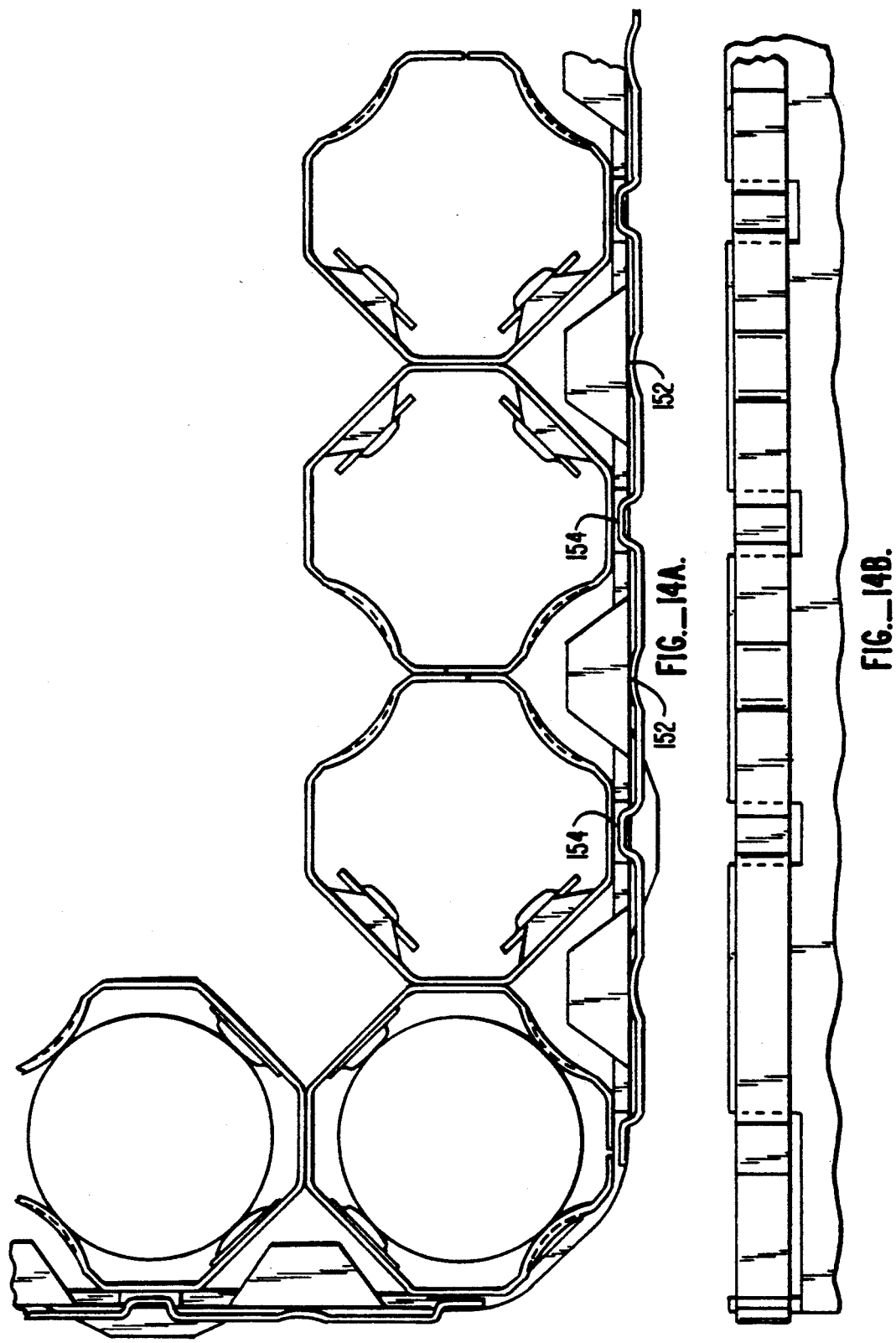

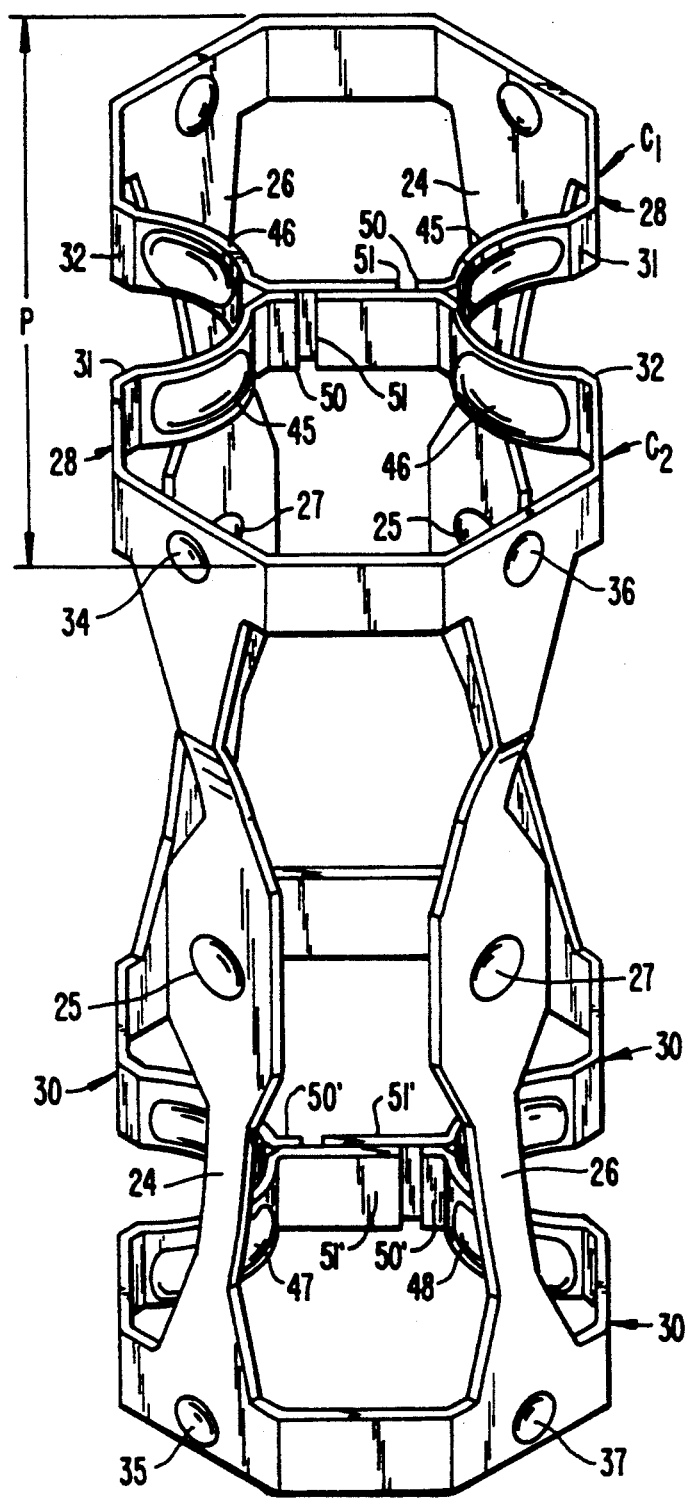
FIG._16.

5,209,899

COMPOSITE SPACER WITH INCONEL GRID AND ZIRCALOY BAND

This application is a Continuation-in-Part of Ser. No. 07/633,046 filed Oct. 25, 1990, now U.S. Pat. No. 5,089,221 patented on Feb. 18, 1992.

This invention relates to spacers for use in nuclear fuel bundles. More particularly a spacer is disclosed which has an Inconel grid for maintaining side-by-side fuel rods within a fuel bundle in spaced apart relation with a surrounding Zircaloy band which band has relatively low neutron absorption.

BACKGROUND OF THE INVENTION

Spacers are utilized in nuclear fuel bundles in order to maintain the required spacing between vertically upstanding side-by-side fuel rods within the bundles. A review of the construction of nuclear fuel bundles can clarify the function of the spacers set forth herein.

Simply stated, a nuclear fuel bundle contains many so-called fuel rods supported on a lower tie plate. This lower tie plate is for supporting and spacing in side-by-side relation the rods of the bundle. These supported fuel rods extend upwardly of the fuel bundle to an upper tie plate.

The fuel bundle between the tie plates is surrounded by a fuel channel which channel is usually square in cross section. This channel surrounds the fuel rods and extends from the lower tie plate to and beyond the upper tie plate.

Fluid flow occurs within the fuel bundle through the lower tie plate, between the fuel rods, and out through the upper tie plate. Water coolant enters through the lower tie plate and a mixture of steam and water exits through the upper tie plate.

Fuel rods are typically of the order of 170" long, whereas the fuel rod diameter is typically between 0.35" and 0.50". This being the case, it is necessary to brace the fuel rods in between the tie plates with spacers.

The primary function of a spacer is to support the fuel rods and hold them in their correct side-by-side relation. A secondary function of the spacers is to enhance the water film on the fuel rods and to improve the critical power performance. Simply stated, by maintaining a water film on the fuel rods, the individual rods are maintained in an optimum steam generating condition and have resistance to so-called "non-nucleate boiling" which can cause overheating and damage to the individual fuel rods.

Spacers are commonly constructed with two constituent parts. The first constituent part includes an interior grid. In one type of spacer, this grid consists of an array of ferrules which ferrules surround each of the fuel rods and keep the fuel rods spaced apart one from another. The second constituent part of the spacer is an outer band. This band extends around the grid and locates the grid inside the channel. The band occupies some of the gap between the grid and the channel, and limits the coolant flow between the grid and the channel. Without the band, there would be excessive flow near the channel which does not contribute to cooling the fuel rods.

In one spacer type, a ferrule surrounds each fuel rod. The outer band has flow tabs along its upper edge. The flow tabs are adjacent the channel wall and hence function to direct some of the steam water mixture onto those fuel rods at the edge. This redirected flow increases the thickness of the water film on the edge rods and increases the critical power for these rods.

Spacers have two adverse effects on fuel bundle performance. First, each spacer is an obstruction to the coolant flow. Consequently, it increases the pressure drop through the fuel bundle. The increase of pressure drop within a fuel bundle is undesirable, especially with modern high density fuel rod arrays exceeding eight by eight and often including arrays ten by ten or denser. Consequently it is desirable to construct the grid portion of the spacers to produce as little pressure drop as possible. However, the thickness of the material from which the ferrule portion or grid portion of the spacer is constructed sets a lower limit on the minimum of flow area obstructed by the spacer.

Secondly, the spacers absorb neutrons. Additional fuel is required to compensate for the reactivity loss resulting from the neutron absorption.

SUMMARY OF THE PRIOR ART

In current boiling water reactor fuel designs, two types of fuel rod spacers are used. In one type of fuel rod spacer the entire spacer construction is mainly of Zircaloy, a metal having a low neutron absorption. Unfortunately, Zircaloy is not suitable for use as a spring material. As a consequence, such spacers require separate springs, usually manufactured of Inconel. The springs are held in place in the spacer by elaborate construction techniques.

The other type of known spacer uses Inconel in the entirety for both the structure of the grid, the springs and the surrounding band. The springs are fabricated as an integral part of the grid structure.

Each type of spacer has its advantages and disadvantages.

Spacers constructed of Zircaloy have the advantage of having a very low neutron cross section. Thus, those spacers have a small adverse effect on the so-called neutron economy necessary for the maintenance of an efficient nuclear reaction. However, the minimum thickness of Zircaloy is limited to about 0.020" because of corrosion and hydriding. This thickness sets a minimum cross-sectional area of the spacer and, therefore, sets a lower limit to the pressure drop of the spacer.

Spacers constructed of Inconel have very good corrosion resistant properties. Further, such spacers are not subject to hydrogen embrittlement and have a relatively high yield strength. Therefore, they can be used in thicknesses as low as about 0.010". Therefore, the resultant pressure drop from the use of such spacers is low. However, Inconel has a very high neutron cross-section. An Inconel spacer will absorb more neutrons than a Zircaloy spacer, even though the volume of the Inconel spacer is considerably less than that of the Zircaloy spacer.

In summary, spacers constructed entirely of Inconel have low pressure drop but high neutron absorption. Spacers having mainly Zircaloy with Inconel springs have low neutron absorption but much higher pressure drop.

SUMMARY OF THE INVENTION

An improved spacer is disclosed which contains an Inconel grid and a Zircaloy surrounding band. In the prior art Zircaloy spacers, most of the pressure drop of the spacer is caused by the grid, and the band contributes little to the pressure drop. Therefore, most of the pressure drop advantage of the Inconel spacer can be obtained by using an Inconel grid. A Zircaloy band gives a slightly greater pressure drop than an Inconel band, but the effect is small. A Zircaloy band provides good critical power performance for the outer fuel rods and has much less neutron absorption than an Inconel band.

In prior art spacers, a Zircaloy band is welded to a Zircaloy grid, or an Inconel grid is welded to an Inconel band. In the disclosed spacer, the Inconel grid cannot be welded to the Zircaloy band. Therefore, the grid and band must be joined by other methods.

When the band and grid are not welded together, the band is subject to vibration caused by flow forces. Therefore, the band must be made rigid, or must be attached to the grid in a manner which prevents vibration.

At the corners of the spacer, the clearance between the spacer and the surrounding channel is small. This clearance becomes smaller as the fuel rod lattice changes from an 8×8 array to a 9×9 array and to a 10×10 array. If a thick-wall Zircaloy band is placed around and outside of a corner Inconel cell, interference between the band and the surrounding channel results. Therefore, provision must be made in the spacer design to avoid this problem.

The Inconel grid can be fabricated from extremely thin and highly elastic spring metal utilizing a modification of a prior art cell construction including individual cells for holding and locating each fuel rod. Each cell includes paired inwardly bent vertical spring legs with cantilevered and rod encircling upper and lower arm pairs. The spring legs extend at spaced apart locations between the upper and lower arm pairs and have a medial rod contacting portion. This medial rod contacting portion biases the rods within each ferrule of the grid onto stops on the rod encircling arm pairs. The springs of each cell are provided with spring dimple stops at the upper and lower ends to prevent over stressing of the spring during handling of the fuel bundle into which the spacer is incorporated and during insertion of the fuel rods into the spacers.

A single cell with its cantilevered arms is fragile and difficult to handle during assembly. Therefore, pairs of cells are spot welded together such that the spring pairs are at opposite ends of the cell pair. This provides a rigid and rugged structure which can be easily manipulated during assembly of the spacer. The cell pairs can in turn be arranged as a unit to define the necessary types of spacer grids required for any particular cell construction. A preferred cell construction for a ten by ten fuel rod matrix is disclosed including, a grid enabling the placement of water rods of varying diameter. In the lower part of the fuel bundle this grid provides for support of fuel rods at all lattice positions. In the upper part of the fuel bundle there are missing lattice positions overlying part length fuel rods which permit upward venting of steam and thus reduce the pressure drop.

An improvement to the rod encircling arms is provided. Specifically, the rod encircling arms are given a differential length. On the upper rod encircling arms, the two rod encircling arms are given a respective short length and a longer length. On the lower rod encircling arms, the two rod encircling arms are given a respective longer length and a shorter length. With this respective alignment, the upper short arm overlies the lower long arm and the upper longer arm overlies the lower short arm. These two features enable the discrete cell assemblies to be fastened to one another at their respective arms ends as well as to provide a cell assembly that cannot be reversed inadvertently during assembly.

An all Zircaloy band is disclosed which encircles the Inconel grid. Two embodiments of this band are disclosed. In the first embodiment, slots are provided in the corners of the Zircaloy band. Portions of the corner Inconel cells project into these slots, thus capturing the Inconel grid. Each of the four sides of the band has a corrugation extending over most of the width of the side. This corrugation gives the band sufficient stiffness to prevent flow-induced vibration of the band.

The second embodiment of the band does not have the corrugations but has notches in the band at the upper and lower edges. These notches are adjacent to sides of the Inconel grid cells. An Inconel strap is used on each side of the band at the upper and lower edges, and overlies the notches in the band. At each notch, the strap bends inward to contact the grid, and is welded to the grid. The strap is designed to act as spring, and apply a spring force to the band at points between the notches. These spring forces hold the band against the grid and prevent vibration of the band. There results a spacer with an Inconel grid and surrounding Zircaloy band having minimum pressure drop and minimum neutron absorption useful with a high density fuel rod matrix required in modern fuel bundle design.

OTHER OBJECTS, FEATURES AND ADVANTAGES

An object of this invention is to disclose a spacer having an internal grid constructed of minimum of spring material (such as Inconel) with a surrounding band comprised of material having a low neutron absorption cross section (such as Zircaloy). According to this aspect of the invention, a plurality of spring metal spacer cells are used. Each cell includes at least one spring leg having an inwardly deflected medial portion for contact with a fuel rod within the spacer cell. Each cell or ferrule includes at least two rod encircling arms affixed at remote ends of the spring legs. These rod encircling arms surround each fuel rod and define stops for abutting against the fuel rods. A unitary grid is fabricated from groups of the spacer cells. A grid encircling band is provided fabricated from material having a low neutron cross section such as Zircaloy. The band consists of two or four symmetric segments which are placed to encircle the grid. Mechanical means are provided to interlock the band with the grid. After placing the band segments around the grid, the segments are welded together. The firm fastening of the low neutron absorption band to spring metal grid results.

An advantage of the disclosed band is that it can be formed from material having low neutron absorption. It has been found that continuous thick bands have superior hydraulic performance compared to thin spring metal bands containing formed apertures for the reduction of neutron absorption. Specifically, such bands cause more coolant flow from the inside of the fuel bundle channel wall to the outer fuel rods.

A further object of this invention is to disclose spring metal spacer cell pairs for use in constructing spacers. According to this aspect of the invention, the two cells of a cell pair are confronted with their spring legs remote from one another. Fastening of the cell pairs by spot welding occurs at their rod encircling arms. As a result, a stable substructure is formed in which the two cells of a pair mutually reinforce one another. The resultant substructure can be a building block for various arrays necessary in spacer construction.

An advantage of this aspect of the invention is that the paired cell arrays can be configured to receive all types of water rods as well as to define open regions overlying partial length rods for permitting the free passage of the steam/water mixture.

A further object to this invention is to disclose an improved construction to the cells of this invention. According to this aspect of the invention, dimples are formed in the rod encircling arms, just above and below each spring. The dimple is dimensioned with respect to the rod contacting portion of the spring to prevent movement of the spring beyond the elastic limit responsive to rod loading on the spring. Accordingly, during assembly of the fuel bundle and during transport of the fuel bundle, overstressing of the spring legs in each of the cells is avoided.

A further object of this invention is to disclose a band construction which provides sufficient clearance between the spacer corners and the surrounding channel, and which keys the grid into the band. According to this aspect of the invention, horizontal slots are provided in each corner of the band. The arms of the corner cells project into these slots, locking the grid in position.

An advantage of this aspect of the invention is that the slots provide a means for locking the grid to the band, and allow the band to be moved inward at the corners, thus giving clearance between the spacer corner and the channel corner.

A further object of this invention is to disclose a band construction which will not vibrate due to flow forces. According to one embodiment of this aspect of the invention, a long horizontal corrugation is formed in each side of the band. These corrugations create a very stiff band structure. According to the second embodiment of this aspect of the invention, an Inconel strap is used at the upper and lower portions of each side of the band. These straps fit into notches in the band and enclose the regions of the band between the notches. At the notches, the straps contact the arms of the Inconel cells and are welded to these arms.

An advantage of this aspect of the invention is that the band acts as a very stiff structure, and is not subject to flow-induced vibration.

DETAILED DESCRIPTION OF THE DRAWINGS

Other objects, features and advantages will become more apparent after referring to the following specification and attached drawings in which:

FIG. 1A is a perspective view of a prior art spacer cell or ferrule utilized in constructing a prior art spring steel matrix;

FIG. 1B is a side elevation of such a prior art cell;

FIG. 1C is a top plan view of such a prior art cell, the view here illustrating in perspective a group of such members being fastened one to another in a front to back with the spring legs of each unit alternating;

FIG. 2A is a front elevation of an unbent blank before formation into the cell unit of this invention;

FIG. 2B is a perspective view of paired cell units fabricated from the metal blank of FIG. 2A, these paired cell units being shown confronting one another at their rod encircling bands with the spring legs of each cell unit being remotely positioned in each cell pair;

FIG. 2C is a side elevation taken along the spring at FIG. 2B illustrating the improved spring leg construction including upper and lower spring stop dimples for preventing overextension of the defined spring legs within the individual spacer cell;

FIGS. 3A and 3B are plan and respective side elevations of a portion of a spring metal unitary grid formed from a plurality of cell units such as those illustrated in FIG. 2B;

FIG. 4 shows a plan view of a spacer for a 10×10 array with a large central water rod;

FIG. 5 is the same as FIG. 4, except that the cell pairs are arranged to define openings in grid which would overlie partial length water rods; the openings being provided to reduce pressure drop through the spacer;

FIG. 6 shows an arrangement of cell pairs to accommodate two water rods;

FIG. 7 is an enlarged view of the spacer of FIG. 6, showing the region surrounding one of the water rods;

FIGS. 8A and 8B are respective plan and side elevations of an inner band segment of the grid of FIG. 7;

FIG. 9 is a plan view of the complete spacer with the preferred embodiment of the band, two of the four band segments being shown separated from the grid, prior to welding to form a continuous band;

FIG. 10 is a plan view of one of the segments of the preferred embodiment of the band;

FIGS. 11A and 11B illustrate a side elevation and side elevation section of the band;

FIG. 11C is an enlarged view of the spacer at the corner illustrating apertures for permitting spring flexure through the band side and illustrating keying of the Zircaloy band to the inconel grid;

FIGS. 12A and 12B are a plan view and a side elevation of one of the band segments, for the second embodiment of the band;

FIGS. 13A and 13B are a plan view and a side elevation of the Inconel strap for the second embodiment of the band;

FIG. 13C is an enlarged view of a portion of the strap of FIGS. 13A and 13B;

FIGS. 14A and 14B are a plan and side elevation of the second embodiment of the band, illustrating the capture of the band by the strap;

FIG. 15 is a perspective view of a fuel bundle illustrating the placement of the spacers of this invention; and, FIG. 16 is a perspective view similar to FIG. 2B with the differential lengths of the overlying and underlying rod encircling arm lengths being reversed so that an overlying long arm over lies and underlying short arm and an overlying short arm over lies and underlying long arm to enable the cell assembly to be reversible.

Referring to FIG. 15, an exemplary fuel bundle F is disclosed in which spacers are utilized. Specifically, a lower tie plate N and an upper tie plate U are illustrated. Lower tie plate N supports the fuel rods 9. Upper tie plate U braces the rods in the vertical upstanding side-by-side relation to maintain the fuel rods vertically parallel to one another. A channel 8 surrounds the fuel rods between the tie plates and continues fluid flow from the lower tie plate N to the upper tie plate U.

Spacers S1 and S2 are located between the tie plates and around the fuel rods. These spacers function to maintain the sid-by-side alignment of the fuel rods 9 between the tie plates as well as to provide improved fluid flow, especially from the inside of the channel 8 to the outer fuel rods in the fuel bundle.

Having set forth the generic construction of an exemplary fuel bundle F, the construction of a spacer grid of the prior art will be set forth. Thereafter, the improvements of the present invention to the spacer grid will be set forth. Finally, various spacer constructions which can be utilized in fuel bundles will be illustrated.

Referring to FIG. 1A, an illustration of a discrete cell C' of the prior art is set forth. The cell includes two spring legs, 14, 16. These respective spring legs are spaced apart one from another and are connected at the top by rod encircling arms 18 and at the bottom by rod encircling arms 20. Each of the respective spring legs 14, 16 is deflected inwardly and defines at a central portion thereof respective rod contacting portions 15, 17.

The respective arms 18, 20 when surrounding a fuel rod must form stops onto which the fuel rod is urged. Therefore, the arms in their encirclement of a fuel rod are bent inwardly at respective stop portions. These stop portions include arcuate portions 21, 23 in upward arms 18 and arcuate portions 25, 27 in lower arms 20.

Typically, a fuel rod R (shown in broken lines) passes medially through each cell unit. As can be seen, the fuel rod is urged at the rod contacting springs portions 15, 17 onto the respective stops 21, 23 in upper arms 18 and 25, 27 in lower arms 20.

Referring the FIG. 1C, the method of fastening together the cells of the prior art can be seen and understood. Specifically, the spring legs 14, 16 of each cell units adjoin the cantilevered arms 18, 20 of each adjacent cell unit. It will hereafter be emphasized that in the construction of the cell units of this invention the spring legs of pair cell units are remote from one another. This remote placement enables the rod encircling bands to extend across the center of the cell pair while the respective spring legs are at remote extremes of each cell pair. (See FIG. 2B and the position of the respective spring legs 24, 26.)

Having set forth the prior art cell construction with respect to FIGS. 1A, 1B and 1C, the preferred embodiment of this invention will now be set forth.

Referring to FIG. 2A, a front elevation is shown of a blank of spring material precut to form a cell C utilized with this invention. As will be set forth, cell C is similar to cell C' illustrated in FIG. 1A. Specifically the spring metal is preferably an alloy sold under the trademark of Inconel by the International Nickel Company. The metal is 0.008" to 0.012" thick and die cut in the shape of FIG. 2A. Specifically, there is a first spring leg 24, a second spring leg 26 with an upper rod encircling arm 28 and a lower encircling arm 30.

Observing the upper portion of the metal to be formed into the cell, it can be seen that an axis 33 is utilized to divide at a medial location the metal blank between the respective spring legs 24, 26. At the upper arm 28, leg 31 is slightly shorter than leg 32. Similarly, the lower arm 30 has legs which differ slightly in length. This difference in the lengths of the legs is a departure from the prior art. The use of these respective long and short legs will be illustrated with respect to FIG. 2B to show the attachment of the two formed cell structures C into a convenient self-bracing structural unit for fabrication of the spacer set forth herein.

Additionally, and over the prior art, an upper spring stop 34 and a lower spring stop 35 are formed in the respective arms 28, 30 overlying the spring leg 24. As will be set forth with respect to FIG. 2C, these respective stops prevent bending of the spring leg 24 beyond the elastic limit. Similarly, a spring stop 36 and a spring stop 37 is formed overlying spring leg 26. These respective stops function identically to stops 34, 35 in preventing bending of the spring leg 26 beyond the elastic limit.

The reader will understand that during shipment of fuel bundles the spacers frequently become dynamically loaded with the weight of the fuel rods. The respective stops function to prevent overloading of the spring legs during fuel bundle assembly and during transport.

Those understanding the construction of the prior art spacers will realize that bending is typically formed by passing the material of FIG. 2A through a series of bending dies. Respective bends are made at each of the dies until the full structure of one of the discrete cells C1 or C2 FIG. 2B is formed. Since the construction of such a series of dies is well within ordinary skill in the art, such construction will not be set forth herein. It will suffice to say that the cells C1 and C2 are individually fabricated as shown in FIG. 2B.

Referring to FIG. 2B, two cells C1 and C2 are illustrated in a cell unit P. Each cell includes spring legs 24, 26 with an upper arm portion 28 and a lower arm portion 30. Each of the spring legs 24, 26 has a rod contacting portion 25, 27. Rod contacting portion 25, 27 biases a contained rod into the rod stops 45, 46, 47, 48.

It will be understood that bands 45, 46, 47, 48 are given a compound curvature. This curvature is inward toward the contained fuel rod in each cell so that the fuel rod bears against the bands 45, 46, 47 and 48. It will further be seen that bands 45, 46, 47, 48 are convex as exposed to the fuel rods. This convex curvature enables the fuel rods to be inserted within each cell without the end of the fuel rod hanging up on the end of the cell.

It can be seen that upper arms 28 and lower arms 30 are bent into encirclement so that the respective arm ends at 50, 51 on cell unit C2 are off-center with respect to the arm ends 50, 51 from cell unit C1. In the construction of the cell unit pair P of cell units C1, C2, the two cell units are preferably confronted one to another. Thereafter and in the confronted position at the respective upper arms 28 and lower arms 30, the units are spot welded. It can be seen that there is formed a structurally rigid unit.

The respective spring legs 24, 26 of cell unit C2 and 24, 26 of cell unit C1 form rigid spaced apart vertical legs members to the paired cell units.

At the same time, the joined together upper arms 28 and lower arms 30 form horizontal spanning units. As will hereinafter be illustrated, this cell unit pair can be conveniently manipulated to construct varying configurations of a spacer.

An aspect of the prevention of spring leg movement beyond the elastic limit may be illustrated with respect to FIG. 2C. Referring to FIG. 2C, it can be seen that it is a vertical side elevation of spring member 26 taken along lines 2C—2C of FIG. 2B. The spring leg 26 is shown in two positions.

The solid lines show the spring in its normal position, where it biases the fuel rod against the stops. As can be understood, the rod when so biased will be well away from the respective spring stops 36, adjacent upper arm 28 and stop 36 adjacent lower arm 30.

If, however, the fuel rod is biased to fully deflect spring member 26, the rod contacting portion will move to the position shown at 27'. In this position, the rod R will be biased against the respective stops 36. A three point stance will result with no further deflection of the spring member 26. This being the case, it will be understood that by selecting the dimension of the respective spring 26 and of the rod contacting portion 27 and of the upper and lower stops 36, flexure of the spring can be limited so that yielding and permanent deflection of the spring does not occur.

Having set forth the cell pair here illustrated, brief reference may be made to FIGS. 3A, 3B, 4A, 4B, 5, and 6 for the disclosure of the varying patterns into which the cell pair may be constructed.

Referring to FIG. 3A, there is shown a schematic in which 4 lattice positions are occupied. In this 4 lattice position unit, cell pairs designated P1-P2 are arrayed in side-by-side parallel relation.

Referring to FIG. 3B, the side elevation illustrates the minimal structure of the Inconel sections of the disclosed spacer construction. Specifically, arms 28 extend in a plane at the top of the spacer. Further, arms 30 extend in a plane at the bottom of the spacer. The spatial interval there between is spanned by the spring legs 24, 26. Thus, the spring legs 24, 26 act not only for the bias of the contained fuel rods in the cells but additionally form the vertical interconnecting members between the upper grid (formed by arms 28) and the lower grid (formed by arms 30).

Thereafter, welding at the abutted interfaces of the cell arms 28, 30 (see FIG. 2B) occurs. Such welding is typically by a fusion weld such as that provided by an inert tungsten gas weld or alternately a laser weld depending upon production preferences. At this juncture, a solid and interlocking grid structure is formed. (See FIG. 3B.)

Referring to FIG. 4, a grid having an aperture for a large water rod R shown. The disclosed aperture includes the omission of desiqnated but omitted cell pairs P1, P2, P3, P4, P5 and P6. As can be seen, it is required that the included cell pairs be aligned so that omitted cell pairs P1, P2, P3, and P4 be oriented in one direction while designated but omitted cell pairs P5 and P6 are oriented in an orthogonal direction.

Referring to FIG. 5, an embodiment is illustrated having two types of required apertures. A first aperture constructed precisely analogous to that already illustrated with respect to FIG. 4 is for a water rod R. A second set of apertures are for overlying partial length rods. Such partial length rods are disclosed in U.S. patent application Ser. No. 176,975, filed Apr. 4, 1988 entitled Two-Phase Pressure Drop Reduction BWR Assembly Design, now U.S. Pat. No. 5,112,570, issued 5/12/92.

Referring to FIG. 5, the array shown can be best illustrated by observing cell pairs P1, P2, P3 and P4. Specifically, cell pairs P1 and P3 are across the pictorial representation of FIG. 5. Cell pairs P2 and P4 are oriented orthogonally. The four cell pairs each define a place for two rods. A total of eight rods occupies nine lattice positions. In the center of the cell pairs P1, P2, P3 and P4 is an omitted portion of the grid which omitted portion of the grid is for the overlying of a partial length rod.

It will be realized that this omission is not trivial. Specifically, and during operation at full steaming rates of such a reactor, the locations overlying partial length rods are known to be volumes of high steam venting. These volumes of high steam venting can experience back pressure even when passing the relatively low profiles of the cell pairs here illustrated. By the expedient of aligning four cell pairs around nine lattice positions with the central position vacant, a preferred lattice structure with improved venting is provided.

Those skilled in the art will understand that the remaining pair alignments illustrated at P5-P13 are logical extensions of the pattern illustrated with respect to cell pairs P1-P4. Specifically, it can be seen that in the ten wide lattice array, lattice positions L2,2, L2,4, L2,7, and L2,9 are vacant. These vacancies continue in a similar pattern throughout the ten by ten array here illustrated.

It can thus be seen that the cell pairs here illustrated can be uniquely arrayed for the construction of any desired full length fuel rod, partial length fuel rod, or water rod disposition.

Referring to FIG. 6, two large water rods R1 and R2 are shown positioned in apertures similar to the aperture previously described with respect to FIGS. 4 and 5.

In FIG. 6 the arrangement of cells is slightly different from that of FIGS. 4 and 5. Each corner cell is a single cell, and is not paired with another cell. These cells are oriented so that the springs are oriented away from the corners. The remainder of cells are pairs.

Referring to FIG. 6, a construction of the spacer of this invention is illustrated having two large water rods R1 and R2 in parallel, side-by-side relation. It can be seen that each one of the water rods R1, R2 occupies four lattice positions. The remainder of the cell pairs are arrayed to form a complete grid.

Referring to FIG. 7, a detail of FIG. 6 at the aperture for water rod R1 is illustrated. Two band members 60 form a lining into which the water rod R1 is braced. The construction of these aligning members are illustrated with respect to FIGS. 8A and 8B.

Referring to FIGS. 8A and 8B, it can be seen that the inner band members 60 are formed in two equal segments, which segments have their respective ends at 63, 64. Referring to FIG. 8B, there is an upper member 72 and a lower member 74. These members form the upper and lower portions of the inner band, and encircle a water rod. Referring to FIG. 7, the upper members 72 are welded to the grid cells at locations 66. These respective bands are connected by spring numbers 65, 67 in a manner that is analogous to each of the cell members.

Two features of the band members are noteworthy. First, the band members define respective spring legs 65, 66 each having a spring medial spring portion 68 for bearing on the water rod R1. These respective spring members securely brace the water rod in place and maintain such bracing in the absence of appreciable vibration.

Secondly, deflecting tabs 70 overlie each of the spring leg members 65, 67 at the upper portion of the band members. These deflecting members serve to deflect water passing upwardly to the adjacent fuel rods braced by the spacer.

Referring back to FIG. 7, the attachment of the spacer band 60 interior of the array can be easily understood. Specifically, band ends 63, 64 are identified. It can be seen that by placing two members 60 in the disposition illustrated in FIG. 7 bracing of the respective water rods R1, R2 securely at the spacer can occur.

Having set forth the Inconel cellular arrays and their varied constructions, it will be observed that the construction set forth gives a relatively minimum possible amount of spring material in an array for the spacing of fuel rods. In the typical fuel bundle assembly there are on the order of 7 or 8 such spacer arrays.

It is necessary that such spacer arrays be surrounded by a continuous band. This continuous band locates the spacer within the channel. It also reduces the coolant flow between the grid and the channel wall, and causes water intermixture into the rising liquid and vapor water coolant flowing on the outside of the fuel rods.

Referring to FIG. 9, the grid of FIG. 6 is shown together with the preferred embodiment of the band. The interior cells and water rods are not shown. The band is shown partially exploded away from the sides of the grid. Specifically, band sides B1, B2, are shown spaced apart from the grid G. Bands B3 and B4 are shown in their final position next to the grid.

It will be observed that the bands are broken at respective gap 101 (between bands B1 and B2), gap 102 (between bands B2 and B3), and Gap 104 (between band B4, B1). Gap 103 (between bands B3 and B4) has been welded. Each band includes a plurality of inwardly deflecting tabs 110, which tabs have the function of deflecting water flowing near the sidewall of the fuel channel inwardly to and toward the rod array. Referring to FIG. 10, a band segment B3 of the preferred embodiment is illustrated. Band segment B3 terminates along a first side at end 101 and along a second side at an end 102. Band segment B3 defines a plurality of flow deflecting tabs 110. It is the function of these tabs to deflect water flowing along the channel sides to and toward the array of contained fuel rods.

The band also includes respective raised portions 120. These respective raised portions enable the band to standoff from the sidewalls of the channels. The respective raised portions 120 additionally can have two alternate functions.

First, the respective raised portions can themselves deflect water flowing along the sides of the channel. Such deflection causes a turbulence which ensures mixture of any water layer flowing along the inside of the channel to and towards the fuel rod array.

Secondly, the raised portions 120 are oriented to provide stiffness to the band. With a flexible band, flow induced vibration of the band can occur. In the natural mode of vibration the band deflects away from the grid and the maximum deflection occurs halfway between the corners at each side of the spacer. Referring to FIG. 9, the location of maximum deflection on the left side of the spacer is at 103.

FIG. 11A shows a side elevation view of the preferred embodiment of the band. The raised portion of the band 120 extends over most of the band width and over slightly more than half of the band height. FIG. 11B shows a section at B—B of FIG. 11A and illustrates the shape of the raised portion 120. This shape is similar to a corrugation, and gives the band side a stiffness several times that of a band with no raised portion. This increased stiffness prevents flow induced vibration of the band.

FIG. 11C shows an enlarged top view of the corner region of the spacer, together with the corner region of a channel 130. The distance 132 between the inside of the band and the channel 130 should be small, in order to provide good thermal performance for the outer fuel rods. Unfortunately, as the gap 132 is reduced, the gap between the corner fuel rod and the channel corner is also reduced. For a given gap 132 along the sides, the corner gap becomes smaller as the fuel rod array is changed from an 8×8 array to a 9×9 and to a 10×10 array. As the number of fuel rods in each row and column is increased, the corner rod moves closer to the channel. The channel corner radius cannot be decreased, because the channel corners would then interfere with other reactor components.

FIG. 11C has been drawn approximately to scale for a 10×10 array. If the corner portion 136 of the Zircaloy band were to lie entirely outside the corner Inconel cell, there would be insufficient clearance between the band and the channel corner, and insertion of the space into the channel would be difficult or impossible.

Referring to FIG. 11A, slots 138 have been cut into the corner of the band. The upper and lower arms of the corner cell project into these slots. As can be seen in FIG. 11C, the band corner 136 can then be moved away from the channel corner, toward the corner fuel rod. At the same time, the grid is captured by the band since part of the grid projects into the corner slots.

It will thus be understood that the band members at their respective corners accommodate the decreasing diameter of the fuel rod R1. At the same time, these corner sections key firmly the band members B1-B4 around the spacer to the Inconel spacer grid.

FIGS. 12A, 12B, 13A, 13B, 13C, 14A and 14B illustrate an alternate embodiment of the Zircaloy spacer band. In this embodiment, the band stiffness is not increased. Instead, Inconel straps are used to tie the band to the Inconel grid.

FIG. 12A shows a top view of a segment of this band. As in the prior art, bath tub type indentations 140 are used to space the band away from the channel. FIG. 12B shows a side elevation view of this band. A change from the configuration of FIGS. 11A and 11B is that cutouts 142 are made at the top and bottom of the band. These cutouts are used in conjunction with Inconel straps, which will be described later. Additional cutouts 144 are used at the band corners. These cutouts perform the same function as the corner slots in the preferred embodiment. The upper and lower arms of the corner cell project into the cutouts, allowing the band corner to be spaced away from the channel corner.

FIGS. 13A, B, and C show the Inconel strap. FIG. 13A is a side elevation view of an Inconel strap. The length l of the strap is slightly less than the width of the spacer and the width w is equal to the width of the spacer arms. FIG. 13B shows a top view of the strap. The bends 150 project into the cutouts 142 of FIG. 12B. FIG. 13C shows an enlarged top view of the strap. A projection 152 is used to bear against the band, halfway between the bend regions 150.

FIG. 14A shows a top view of a portion of the to the spacer grid. The strap acts as a series of springs, bearing against the band at the points 152. The strap is shown prior to welding to the grid. In this position there are gaps 154 between the strap and grid.

To attach the strap to the grid, the gaps 154 are closed, bending the strap and applying loads to the band at the contact points 152. The Inconel strap is then welded to the Inconel grid at locations 154. FIG. 14B shows a side elevation view of the strap and part of the band.

Referring to FIG. 16, an alternate and now preferred embodiment of the cell construction is illustrated. In this embodiment—similar to that shown in FIG. 2B—two cell pairs C1 and C2 are shown confronted at their respective upper rod encircling arms 28, and their respective lower rod encircling arms 30. The difference here is that the respective locations of the long rod encircling arms 51 and short rod encircling arms 50 has been changed at lower arms 30.

Specifically, and referring to lower arms 30, it can be seen that short rod encircling arms 50' underlie long rod encircling arms 51. Further, and referring again to lower arms 30, it can be seen that long rod encircling arm 51' underlies short rod encircling arm 50.

This configuration has a specific advantage. It has been found during assembly of the disclosed spacer matrix, that rotation of one cell assembly C1 relative to the other cell assembly C2 almost inevitably occurs. Where such rotation occurs according to the embodiment of FIG. 2B, the gaps between the short arm sections 50 and the long arm section 51 align. Where such rotation occurs according to the embodiment of FIG. 16, the gaps between the arm sections 50', 51' on lower arms 30 and the gaps between the arm sections 50, 51 on upper arms 28 remain unchanged. Error does ot occur upon inadvertent rotation of the arms sections.

What is claimed is:

1. A spacer for use in an uclear fuel bundle having a plurality of fuel rods, said spacer comprising in combination:

a plurality of spring metal spacer cells, each cell having;

at least one spring leg, said spring leg inwardly deflected at the medial portion thereof for spring contact with a fuel rod within said spacer cell;

at least two rod encircling arms affixed at remote ends of said spring legs;

each rod encircling arm defining stops for abutting a fuel rod whereby said spring leg can bias an encircled fuel rod within said cells into said stops;

said rod encircling arms having differential length including an upper pair of rod encircling arms having a first end of said arms having a relatively longer length and a second end of said arms having a relatively shorter length and a lower pair of rod encircling arms having a first end of said arms having a relatively shorter length and a second end of said arms having a relatively longer length;

said first end of said upper pair of rod encircling arms overlying said first end of said lower pair of rod encircling arms and said second end of said upper pair of rod encircling arms overlying said second end of said lower pair of rod encircling arms whereby said long end of said arms confronts said short end of said arms upon rotation of one said cell with respect to the other of said cell;

said cells confronted into cell pairs with said spring legs remote from one another;

said rod encircling arms affixed to one another adjacent the end fo said rod encircling arms; each said arm of one cell at one end thereof fastens to a rod arm of an adjacent cell with said relatively longer rod arm of one cell of said cell pair fastening to a relatively shorter arm of the other cell of said cell pair whereby said cell pair forms a unitary rigid substructure;

a unitary grid formed from said cell pairs, each cell pair joined to adjoining cell pairs by welding at said rod encircling arms.

* * * * *